(12) United States Patent
Chang et al.

(10) Patent No.: US 7,131,113 B2
(45) Date of Patent: Oct. 31, 2006

(54) SYSTEM AND METHOD ON GENERATING MULTI-DIMENSIONAL TRACE FILES AND VISUALIZING THEM USING MULTIPLE GANTT CHARTS

(75) Inventors: Rong N. Chang, Pleasantville, NY (US); Hubertus Franke, Cortlandt Manor, NY (US); Ching-Farn E. Wu, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 641 days.

(21) Appl. No.: 10/317,332

(22) Filed: Dec. 12, 2002

(65) Prior Publication Data

US 2004/0117768 A1 Jun. 17, 2004

(51) Int. Cl.
*G06F 9/44* (2006.01)
(52) U.S. Cl. ...................... 717/128; 717/127
(58) Field of Classification Search ........ 717/124–128, 717/105, 131, 132; 345/418, 419, 441, 427; 340/915; 348/87; 714/45
See application file for complete search history.

(56) References Cited

U.S. PATENT DOCUMENTS

| | | | |
|---|---|---|---|
| 4,668,982 A * | 5/1987 | Tinnerino | 348/87 |
| 4,814,765 A * | 3/1989 | DeRoche et al. | 340/915 |
| 5,168,554 A | 12/1992 | Luke | |
| 5,297,248 A | 3/1994 | Clark | |
| 5,347,309 A * | 9/1994 | Takahashi | 375/240.12 |
| 5,442,740 A | 8/1995 | Parikh | |
| 5,564,048 A | 10/1996 | Eick et al. | |
| 5,838,973 A * | 11/1998 | Carpenter-Smith et al. | 717/105 |
| 5,844,558 A | 12/1998 | Kumar et al. | |
| 5,898,873 A | 4/1999 | Lehr | |
| 5,974,391 A | 10/1999 | Hongawa | |
| 6,057,839 A | 5/2000 | Advani et al. | |
| 6,139,500 A * | 10/2000 | Clark | 600/443 |
| 6,219,826 B1 | 4/2001 | De Pauw et al. | |
| 6,226,787 B1 | 5/2001 | Serra et al. | |
| 6,232,984 B1 * | 5/2001 | Chuah et al. | 345/441 |
| 6,240,395 B1 | 5/2001 | Kumashiro | |
| 6,266,805 B1 | 7/2001 | Nwana et al. | |
| 6,269,447 B1 | 7/2001 | Maloney et al. | |
| 6,317,384 B1 * | 11/2001 | Luo et al. | 367/47 |
| 2002/0165838 A1 * | 11/2002 | Vetter | 706/20 |
| 2002/0174415 A1 * | 11/2002 | Hines | 717/127 |

* cited by examiner

*Primary Examiner*—Wei Zhen
*Assistant Examiner*—Anna Deng
(74) *Attorney, Agent, or Firm*—Scully, Scott, Murphy & Presser, P.C.; Douglas W. Cameron, Esq

(57) ABSTRACT

A system and method for visualizing data in two-dimensional time-space diagrams including generating multi-dimensional program trace files, converting and merging them into interval trace files, and generating multiple time-space diagrams (multiple Gantt charts) to visualize the resulting multi-dimensional interval trace files. The needed events and trace information required to form multi-dimensional event traces are described in event trace files typically gathered from running programs, such as parallel programs for technical computing and Web server processes. The method includes converting event traces into interval traces. In one selectable design, the two-dimensional time-space diagrams includes three discriminator types (thread, processor, and activity) and six discriminator-legend combinations, capable of producing seven possible views. The six discriminator-legend combinations are thread-activity, thread-processor, processor-thread, processor-activity, activity-thread, and activity-processor. Each discriminator-legend combination corresponds to one time-space diagram, except that the thread-activity combination has two possible views: Thread-Activity View and Connected Thread-Activity View.

19 Claims, 7 Drawing Sheets

`US 7,131,113 B2`

SYSTEM AND METHOD ON GENERATING MULTI-DIMENSIONAL TRACE FILES AND VISUALIZING THEM USING MULTIPLE GANTT CHARTS

BACKGROUND OF THE INVENTION

1. Field of the Invention

The present invention relates generally to trace visualization schemes using multiple time-space diagrams (Gantt charts), and more particularly to a novel system and method for generating and visualizing multi-dimensional trace files using various views from different aspects.

2. Description of the Prior Art

The reason for poor performance of a program such as a Web server or a Message Passing Interface (MPI) program can be varied and complex, and users need to be able to understand and correct performance problems. Performance tools can help by monitoring a program's execution and producing performance data that can be analyzed to locate and understand areas of poor performance.

One common way of monitoring a program's behavior is to generate trace events while executing the program. Trace data collected during program execution may then be used for debugging, visualization, and understanding the program's behavior. As the size of a trace file may be big and manual examination of large trace files extremely time-consuming, it is common that visualization tools are used to show performance data over time along with various statistic results.

Time-space diagrams (i.e., Gantt charts) are probably the most powerful ones among the diagrams that show performance trace data over time. In a two-dimensional time-space diagram, time is used as one axis while the other axis is organized according to a significant discriminator. A number of timeliness are shown, one for each unique entity of the significant discriminator. We use the term "X-Y View" for a time-space diagram with X as the significant discriminator and Y as legends. For example, a "Thread-Activity View" is a time-space diagram that displays activities using various color or graphic objects to represent various program states or record types (i.e. the legends) along its timelines, one for each thread (i.e., the significant discriminator). Such a diagram displays program states or record types over time, giving clear indication on program activities for any given point in time.

Existing visualization tools for program execution have at most one such time-space diagram. For example, the AIMS [1] toolkit such as described by J. Yan a reference entitled "Automated Instrumentation and Monitoring System," (http://science.nas.nasa.gov/Software/AIMS) has one Thread-Activity View (the OverVIEW) along with other statistic or animated displays for message passing activities. The Nupshot visualization tool such as described by E. Karrels and E. Lusk in a reference entitled "Performance Analysis of MPI Programs," Proceedings of the Workshop on Environments and Tools for Parallel Scientific Computing," 1994, and its follow-on Jumpshot described by O. Zaki, W. Gropp, E. Lusk, and D. Swider in a reference entitled "Scalable Performance Visualization with Jumpshot," International Journal of Supercomputer Applications and High Performance Computing, vol. 13, no. 3, pp. 277–288, 1999 each also have one Thread-Activity View as its main window, plus bar charts for legend histograms. A product called Vampir (e.g., version 2.5, Pallas product, http://www.pallas.de/pages/vampir.htm) is a commercial toolkit for visualization and analysis of MPI programs that also provides only one Thread-Activity View, along with its source code browser, animated communication matrix, and pie charts for statistics. The Pablo Analysis graphical user interface (GUI) of the Pablo project such as described by D. Reed et al. in a reference entitled "Scalable Performance Analysis: The Pablo Performance Analysis Environment," Proceedings of the Scalable Parallel Libraries Conference, pp. 104–113, October 1993 (http://www-pablo.cs.uiuc.edu) is a toolkit of modules capable of processing its Self-Defining Data Format (SDDF) records to calculate statistics such as counts, sums, ratios, maximums, minimums, etc. This SDDF format is described in greater detail in a reference by R. Aydt entitled "The Pablo Self-Defining Data Format," Technical Report, Department of Computer Science, University of Illinois, March 1992, revised April 1995. Unfortunately, there is no time-space diagrams available in Pablo. Although the Pablo project is famous with its SDDF format, the lack of time-space diagrams is clearly one of its deficiencies.

It would be highly beneficial to provide the capability to generate multi-dimensional program trace files and enabling generation of multiple time-space diagrams (Gantt charts) from the multi-dimensional trace files.

It would be further highly desirable to provide the capability of generating many other two-dimensional time-space diagrams that can help users understand a program's behavior, such as: Processor-Activity View, Thread-Processor View, Processor-Thread View, and Activity-Thread View. Obviously, multiple Gantt chart visualization provides multiple time-space diagrams from various aspects of the same trace file and therefore helps users understand a program's behavior.

SUMMARY OF THE INVENTION

It is an object of the present invention to provide an improved apparatus, system, and method to collect trace events, generate multi-dimensional interval traces and create visualizations from the multi-dimensional trace files for users to better understand a program's behavior.

According to the principles of the invention, there is provided a system and method for generating multi-dimensional program traces and creating multiple Gantt chart views for multi-dimensional trace files. The present invention presents visual summaries of a program execution over time from various aspects for improved comprehension of the underlying computer activities.

In order to generate trace files, a tracing library may be used to link with user programs. Alternatively one may use a software plug-in, i.e., a dynamically loaded piece of code for Web servers or browsers, for trace generation. During the execution of the target program, one or more event trace files are generated. In accordance with one aspect of the present invention, required events are specified and a method is provided for converting event traces into interval traces. An event trace file consists of many event records, each of which has a timestamp indicating the point in time when the event was created. An interval trace file, on the other hand, consists of interval records. It is difficult to see an event in a time-space diagram, since a point in time can hardly be seen no matter how much one zooms in. In addition to a timestamp, each interval record has a duration field indicating how long the interval lasts. Intervals are therefore considered to be visualization-friendly and much easier to be visualized than events. Event records in an interval file are intervals with zero duration.

According to the method of the invention, a set of event trace files are converted and merged into a single interval file for visualization. The conversion process takes events in their chronological sequence and match them to form intervals. The merge process is required if more than one event trace file is to be used as input. Fields in an interval record can be derived from the context of its original event trace file, making multiple Gantt chart visualization feasible. Examples include the identification for running entities such as the system process ID/thread ID pair or the entity's logical thread ID, and the identification for processors such as the physical node ID/CPU ID pair or the processor's logical ID.

As each interval record includes identification information on the running entity (thread) and processor as well as activity type, a discriminator-legend combination defines one specific time-space diagram. The significant discriminator and time are used as identifiers along the two axes in the time-space diagram, and legends are shown in the two-dimensional space. For example, the Thread-Processor View has thread as the significant discriminator along the Y-axis, and legends for various processors are used to show how threads are jumping among processors over time.

Advantageously, the system and method for providing multiple views for a multi-dimensional trace dataset is the elimination of trace file explosion currently suffered by other trace visualization tools. Preferably, the multi-dimensional trace datasets are gathered from running programs, such as parallel programs for technical computing and Web server processes.

BRIEF DESCRIPTION OF THE FIGURES

The objects, features and advantages of the present invention will become apparent to one skilled in the art, in view of the following detailed description taken in combination with the attached drawings, in which.

DETAILED DESCRIPTION OF THE PREFERRED EMBODIMENTS

Figure 1:
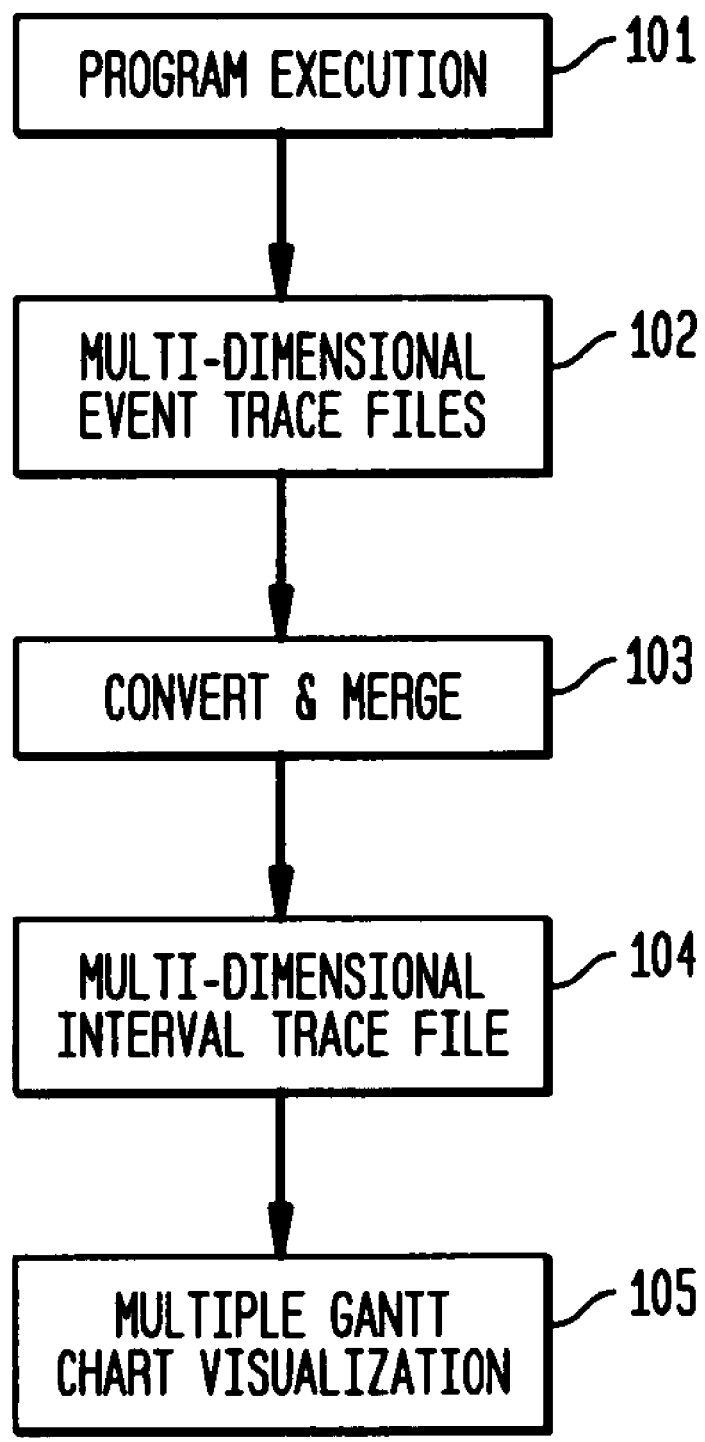
FIG. 1 is a block diagram on one preferred embodiment of the system showing a sequence of steps, from generating multi-dimensional trace files to visualization using multiple Gantt charts.

The invention relates to a system and method for collecting trace events and create multi-dimensional interval traces, and to visualize the multi-dimensional interval traces. Typically, these multi-dimensional traces are gathered from running systems and programs, such as parallel programs for technical computing and web server processes.

In an environment designed for program tracing and visualization, the execution of a program generates trace events of various types. Many existing tools generate trace events at the user level, such as the begin and end events of subroutine calls. The user-level begin and end events are then matched, by the visualization tool or a separate utility program, to calculate durations of various graphic objects to be displayed. The matching process is simple, since it matches basically the begin and end of the same record type.

A visualization tool may match the begin and end events of the same record type inside the visualization tool to simplify the environment. The matching step creates nested and/or overlapped periods that correspond to individual user-level subroutine calls; which are then displayed using various colors or graphic objects. This means the visualization tool reads event trace file in a specific format, matches the begin and end events of the same record type, and derives color or graphic objects all inside the visualization tool, causing serious problems for flexibility even for just one view. This approach is not easy to extend for event trace files coming from other sources, and the tools typically have a limited scope despite its integrated appearance.

If the match process is performed by a separate utility program, the output file can be constructed in a way that can be read by the visualization tool. The above-described Nupshot and Jumpshot visualization tools are typical examples, taking input files in ALOG and CLOG formats, respectively. Such visualization tools read one special-formatted input file, in which each record represents a specific graphic object in a fixed view. This approach provides flexibility for event traces coming from different sources, because utility programs may be developed to convert event trace files into the specific format required by the visualization tool. On the other hand, tools such as Nupshot and Jumpshot suffer from the data explosion problem if one wants to see other time-space diagrams for the same multi-dimensional trace file, because multiple conversions must be performed to create multiple ALOG or CLOG input files for the visualization tool from the same event trace file. This could lead to serious problems for system resources, especially when the trace file size is large.

Obviously, not all trace files are multi-dimensional trace files. User-level tracing collects only user-level events, and can be used to create only user-level Thread-Activity Views, provided that the identification for the running entity is also collected in each event. To generate multi-dimensional trace files, it is necessary to go beyond user-level trace events and collect system-level events as well. Particularly, as the processor and running entity are two additional significant discriminators, process/thread (i.e., running entity) dispatch events are required in the multi-dimensional trace file, in which each dispatch event includes a timestamp, and identification information on both the processor and the running entity. In an SMP (Symmetric Multi-Processor) system each trace event also needs to have the processor identification to indicate which CPU the event is coming from.

FIG. 1 shows the method steps and interfaces for creating multiple Gantt chart visualization, starting from generating multi-dimensional event trace files while executing a target program. The first step, component 101, is to run the target program. Before executing the program a tracing library is linked with the program or added to the system for trace generation, or a dynamically loaded "plugin" module could be used for the purpose of trace generation. It is assumed that there is trace generation system in place to collect multi-dimensional trace events, for example, AIX trace facilities, and do not make assumptions how they are created. In a preferred embodiment, there are different ways for trace generation, through a tracing library linking target programs with a native trace facility, and through the use of dynamically loaded modules using the same native trace facility.

During the execution of the program, one or more event trace files are generated, shown as step 102 in FIG. 1, preferably one per node. Each node in the system could be a SMP machine with multiple processors. Step 103 in FIG. 1 illustrates a convert and merge step, in which the present invention converts and merges a set of event trace files. The resulting file is a multi-dimensional interval trace file, shown as component 104. The last step 105 in FIG. 1, is the step in which a visualization tool displays a multi-dimensional interval trace file over time using multiple time-space diagrams.

Unlike the match process which matches the begin and end events of the same record type for user-level trace files, the conversion process partitions a timeline into disjoint interval pieces. Each interval piece has a field to indicate one out of four interval type: begin interval, end interval, complete interval, and continuation interval. A complete interval indicates that there is no state change for the running entity during the duration of the interval. Thus a complete interval represents a complete state, such as from the entry point of a subroutine to its exit point. A program state could be a period marked by the entry and exit points of a subroutine, a Web URL request, a transaction, or some period defined by the user. If the running entity is swapped out due to process/thread dispatch in the middle of a state, a begin interval for the program state is created to indicate how long the state lasts and when the entity is swapped out. If the entity is swapped in at a later time and continues from the point when it went off until the state is over, an end interval is created to indicate the state is over. On the contrary, if the state has not reached its end point before a new event, such as another dispatch event or the begin event of another state occurs, a continuation interval is created to indicate that the end of the state has yet to be reached. Thus, the four interval types represent four possible situations of a state.

In addition to a timestamp, an interval record has a duration field indicating how long the interval lasts, and a number of required fields, one for each significant discriminator. Thus, an event record is the same as an interval record with zero duration but with less required fields. A significant discriminator is the variable along one dimension, such as the length, width, and height in a three-dimensional space. In a time-space diagram, time is used along one axis, say the X axis. Two more significant discriminator are needed, one for the Y axis and the other for legends. If we use thread, processor, and activity as three additional discriminators, more than one time-space diagrams could be generated. Some of these fields need to be derived from the context of event traces, since it is unlikely that all fields are available in each event record.

Figure 2:
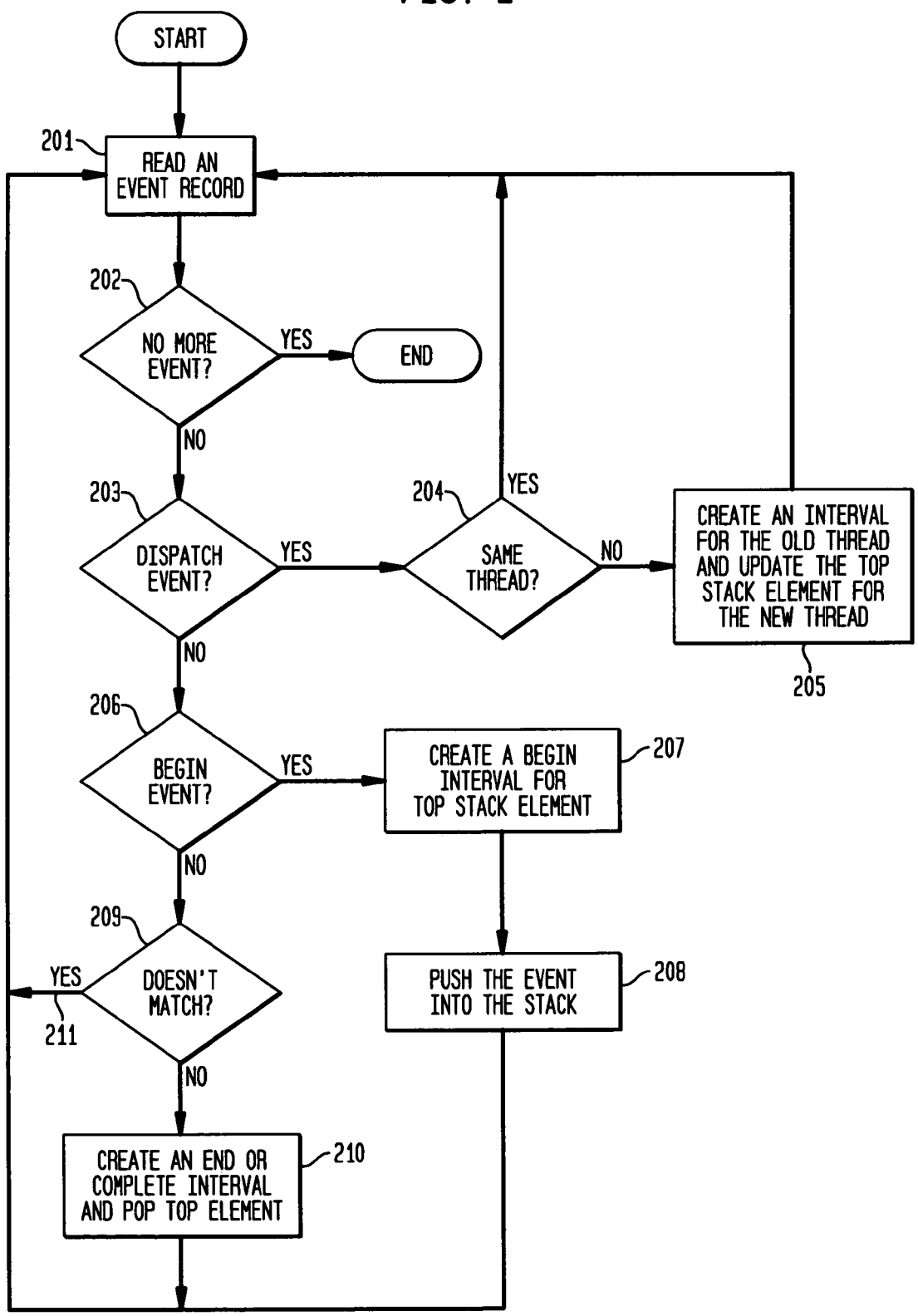
FIG. 2 is a block diagram of the conversion process flow chart showing the conversion logic to produce multi-dimensional interval files.

FIG. 2 shows the flow chart of the conversion process to convert an event trace file into an interval file. For simplicity we assume that user events are matched begin and end events of various record types, and all system events are dispatch events. Such a trace file is among the simplest multi-dimensional trace files. Each running entity in the trace is associated with a stack, which is used to keep track of the call sequence of the thread over time. Once a running thread is recognized from the trace, a running event is placed at the bottom of its initial stack. A running event for the swapped-in thread indicates the thread is running and is not yet inside any other program state.

The conversion process reads one event at a time, shown as component 201 in FIG. 2. It ends when there is no more events to process, as checked by a system component at step 202. If the event is a dispatch event for a different thread to run in a processor, as depicted by system components at steps 203 and 204 in FIG. 2, the conversion process creates an interval for the old thread based on the top element of its thread stack. Component 205 describes steps to be performed at this point. The interval to be created for the old thread could be a begin or continuation interval, depending on whether a begin interval has been generated for the state in this thread. It could also be running interval if the top element of the stack associated with the old thread is a running event. All running intervals are complete intervals. The top element of the stack associated with the new thread is then updated to reflect the new starting time for its next interval. If the dispatch event is for the same running entity in the same processor as indicated at step 203, no interval is created at this point, and the process returns to step 201. This eliminates unnecessary interval pieces and help reduce the size of resulting interval trace files. It is not uncommon to see that the size of an interval file is only half of that for its corresponding event trace file, although interval records have more fields than events.

If the event is a begin event for some record type, as tested by component illustrated at step 206 in FIG. 2, the conversion process reads the top element of the associated stack for the running thread and creates an interval piece for the stack element. This interval piece could be a complete running interval if the top element is a running event, or a begin/continuation interval if it is a user-level event, as shown in step 207. Whether a begin or continuation interval is created depends on if any interval has been generated for the state in the thread. Since the begin event indicates the start of a new state, the conversion process pushes the event into the thread stack, as shown at step 208 in FIG. 2. On the other hand, if the event is an end event of some state, the conversion process checks to see if it matches the event at the top of the stack, as checked by component at step 209. If it does, a complete interval or an end interval piece is created, as shown in component 210. Again, this depends on if any interval piece has been generated for the state in the thread. If the event is an end event but it does not match the event at the top of the thread stack, as it could happen if trace generation starts in the middle of certain state, the event could be just ignored for simplicity as shown by component 211 in FIG. 2, or a special handler could be used to either creating the first interval for the thread or reporting abnormal trace events.

For the case of distributed systems, e.g., where multiple systems work together to solve a problem (e.g., in scalable parallel computing systems) traces may be collected from each of the multiple systems. Thus, a merge process is necessary to collect all of the traces in such distributed systems. To merge interval records from multiple trace files, the merge process reads the first interval from each trace file and order them based on, say the end time of each interval. This could be done using a high-balanced AVL (Adelson-Velskii-Landis) tree, with a pointer pointing to the one with the smallest end time. The merge process outputs the interval with the smallest end time, removes it from the AVL tree, and then fetches the next available interval from the same file and inserts the new interval into the AVL tree based on its end time. This repeats as many times as necessary until all interval records are processed. The resulting output file is a merged interval file.

In the preferred embodiment, a multi-dimensional interval trace makes multiple time-space diagrams (Gantt charts) visualization feasible for understanding program execution over time. In such a diagram, time is used as one axis while the other axis is organized according to some significant discriminator, such as the running entity (thread), the physical hardware (processor), or the program state (activity). Depending on the discriminator and the legend, various views can be derived from the same multi-dimensional interval trace file. Typically multi-dimensional traces are gathered from running programs, such as parallel programs for computation and Web server processes. Thus, users of the multi-dimensional interval traces derived from the system and method of the invention are able to visualize multi-dimensional trace files to observe information such as: 1) how long it took for each subroutine, request or transaction; 2) how much time each thread/process spent running in different states; 3) how much time each SPU spent running in different activities; 4) when threads/processes jump CPUs and for what duration; 5) how CPUs swap multiple threads/processes and for how long; and 6) how congested a certain system resource, such as a URL, is; etc.

For interval records including the physical or logical IDs for the running entity, physical hardware, and program state, for example, possible time-space diagrams capable of being generated include: 1) a Thread-Activity View for displaying activities such as Message Passing Interface (MPI) calls, user subroutines, transactions, or URL requests, using different colors or graphic objects. A Thread-Activity View maybe a view of individual interval pieces, or a view with connected and nested states in which each state represents one complete call, a complete transaction, or a complete URL request. In the latter case it becomes a Connected Thread-Activity View; 2) a Processor-Activity View for displaying activities along timelines, one for each processor. This time-space diagram is typically a view of individual interval pieces, since threads may jump among processors in the same system; 3) a Thread-Processor View for displaying processors (using various colors or graphic objects to represent different processors) along multiple timelines, one for each thread. It can be easily seen in this view how threads jump among processors in SMP systems; 4) a Processor-Thread View for displaying a thread along multiple timelines, one for each processor. This diagram shows CPU sharing (or multiprogramming) among threads in each processor; and, 5) an Activity-Thread View for displaying the number of threads that are currently running in a certain state, such as a specific URL request. Legends in this diagram are positive numbers, represented by various colors or graphic objects, possibly using a gray color for one and white/red colors for numbers much greater than one. This diagram is able to show the concentration of program states, in terms of subroutine names, transactions, or Web URL requests.

FIGS. 3–7 show example multiple Gantt charts visualizations capable of being generated from a multi-dimensional interval trace. In the preferred embodiment, each of the multiple Gantt charts capable of being generated from a multi-dimensional interval trace based on the specified discriminators are viewable by a "single-click". Although only a few of the many possible views are illustrated, it is understood that more views could be shown using other discriminators, e.g., activities. That is, the more discriminators one can specify, the more fields an interval record has, and the more views that the visualization tool can provide. The time scale may remain the same when moving form one view to another, providing instant comparison views.

Figure 3:
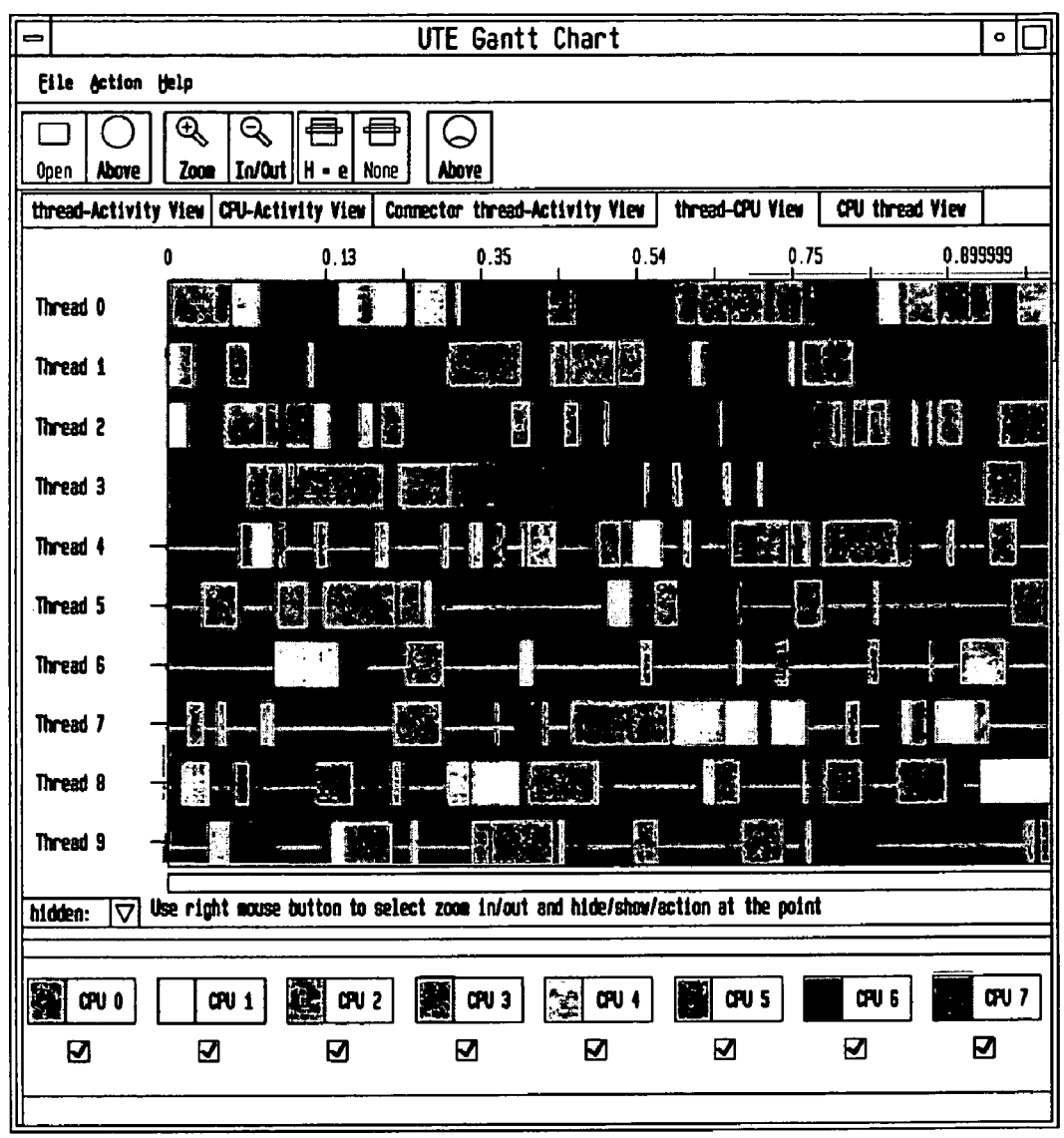
FIG. 3 is a Thread-Processor View showing how threads are jumping among processors over time for a randomly generated multi-dimensional trace file.

FIG. 3 shows an example Thread-Processor View using a randomly generated multi-dimensional trace file. Threads are displayed along the Y-axis and color rectangles representing different processors are shown as legends. The example view depicted in FIG. 3 illustrates clearly how threads are jumping among various processors over time.

Figure 4:
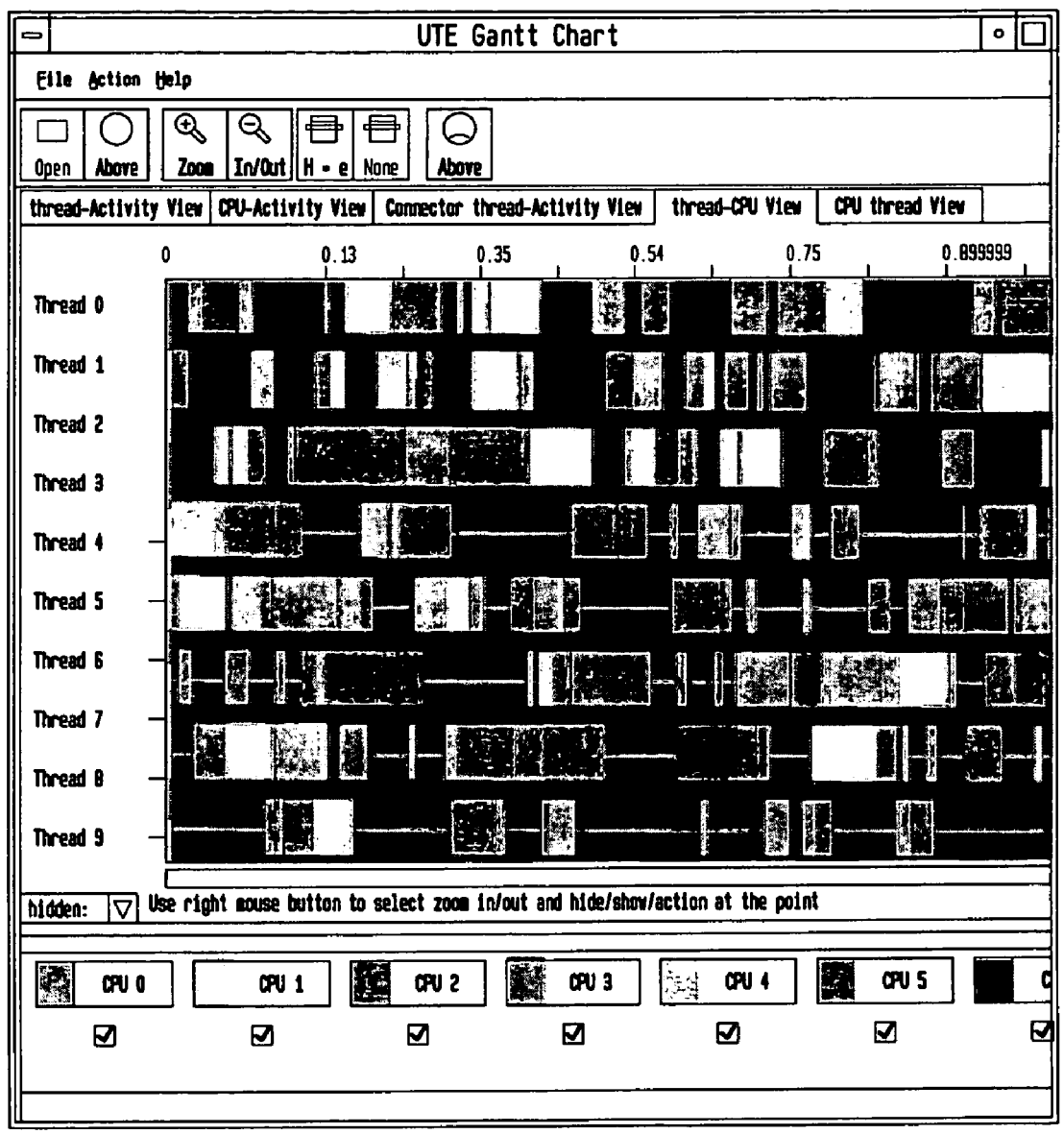
FIG. 4 is a Processor-Thread View showing how multiple threads are sharing each processor over time for the same file.

As each interval record includes identifications for both thread and processor, switching their roles in the time-space diagram is relatively easy. FIG. 4 illustrates an example Processor-thread View for the same multi-dimensional trace file. In FIG. 4, processors are displayed along the Y-axis and color rectangles representing different threads are shown as legends. The example view depicted in FIG. 4 illustrates clearly how threads are sharing processors over time.

Figure 5:
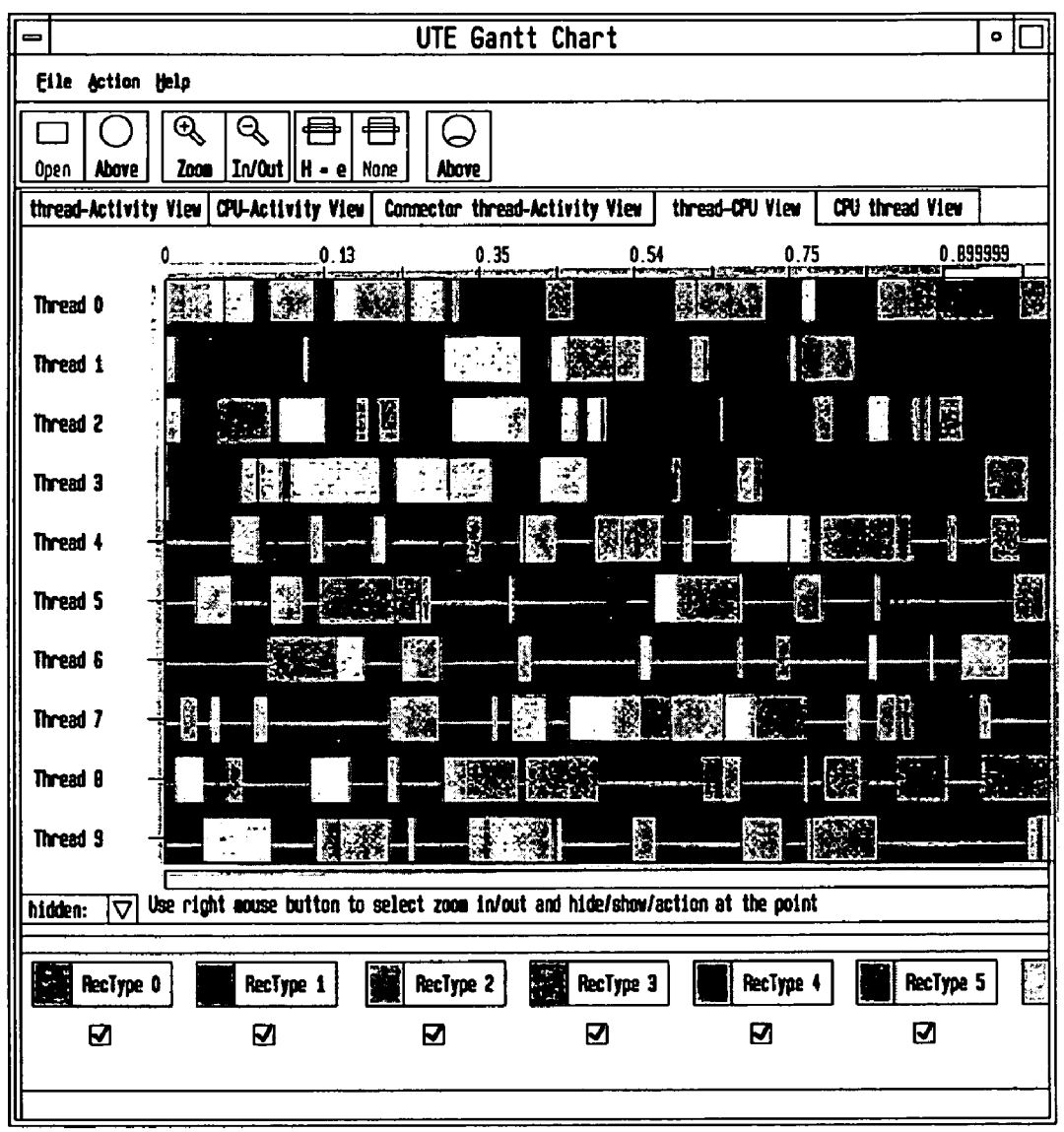
FIG. 5 is a Thread-Activity View showing thread activities over time in each thread for the same file.

FIG. 5 depicts an example Thread-Activity View for the same multi-dimensional trace file. In FIG. 5, threads are displayed along the Y-axis and color rectangles representing various activities (program states) are used as legends. Note that a running state is a program state showing a period when an entity is running but is not in other program states. Therefore the running state is not available in user-level traces in which dispatch events are not collected.

Figure 6:
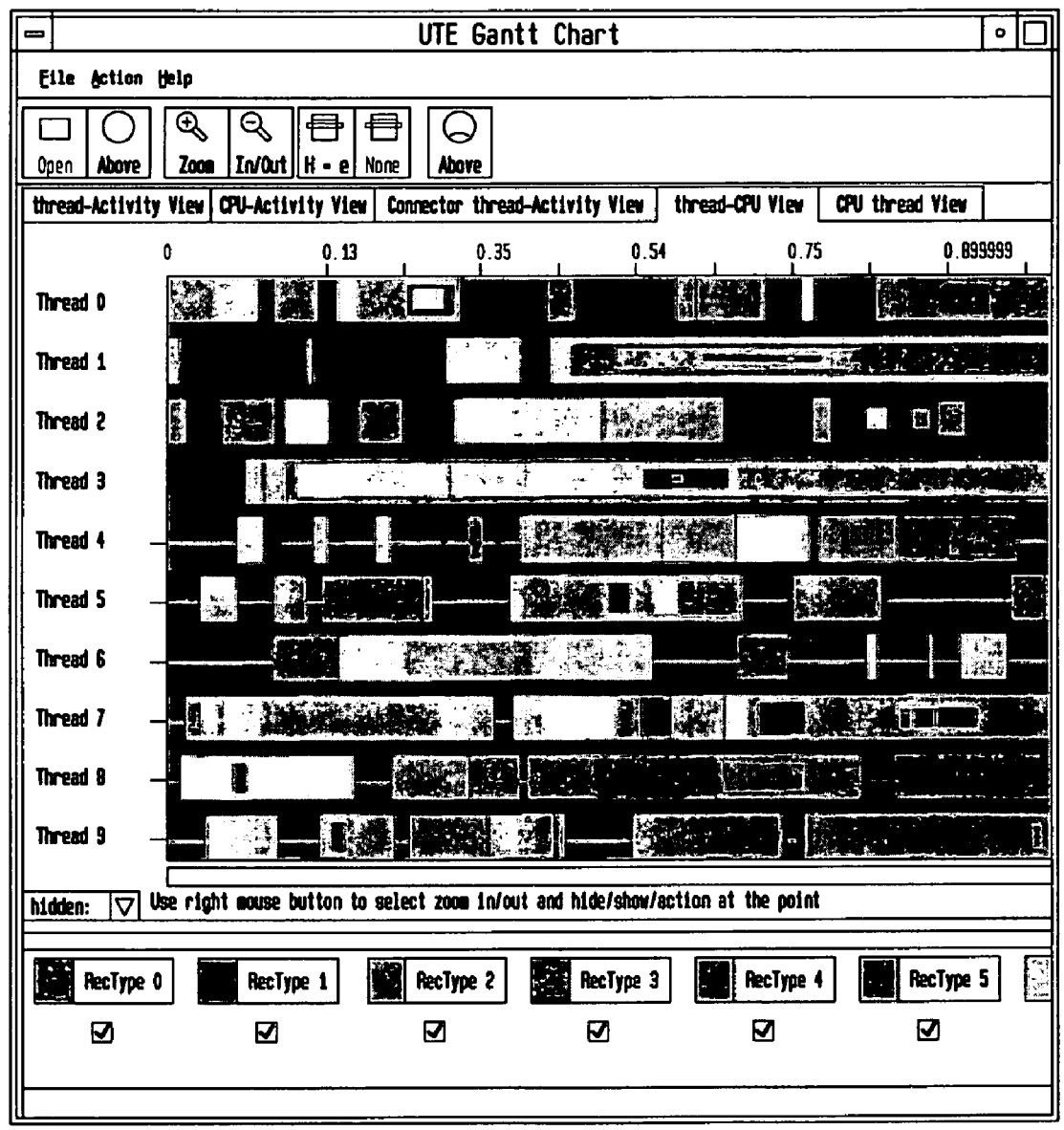
FIG. 6 is a Connected Thread-Activity View showing nested complete intervals, one for each complete state. This view is similar to that in FIG. 5 but with connected states.

Since multiple interval pieces for a given call or program state contain all information about the state such as its start time and end time, the complete interval can be easily constructed from the interval pieces. This creates the Connected Thread-Activity View, which is also the only view available from traditional user-level traces. The discriminator-legend combination of the view is the same as the Thread-Activity View. Because states such as the running state cannot be derived from a user-level trace file, the number of states in its Connected Thread-Activity View is less than that available from a multi-dimensional trace file. FIG. 6 shows an example Connected Thread-Activity View of the same trace file. In the view of FIG. 6, threads are displayed along the Y-axis and color rectangles representing various activities (e.g., program states) are used as legends. Each color rectangle represents a complete state, and states are nested for each thread to show its recorded calling sequence.

Figure 7:
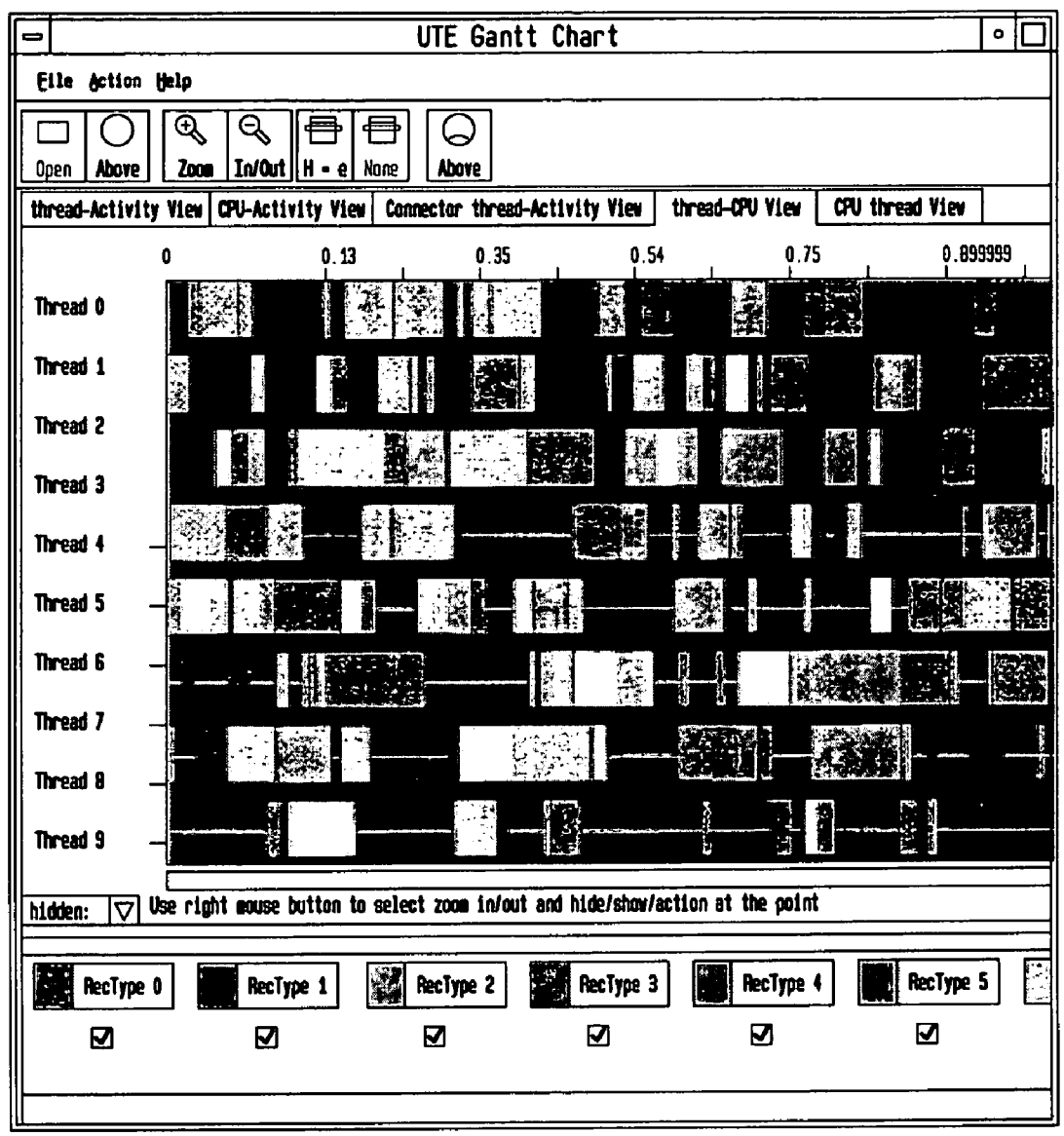
FIG. 7 is a Processor-Activity View showing processor activities over time.

FIG. 7 shows an example Processor-Activity View of the same multi-dimensional trace file. Processors are displayed along the Y-axis and color rectangles representing various activities are used as legends. It shows activities over time for each processor.

Other views not illustrated, such as Activity-Thread View or Activity-Processor View, are definitely legitimate and useful time-space diagrams and may be derivable from the same multi-dimensional trace file. An Activity-Thread View, for example, displays activities along the Y axis and uses color rectangles to represent the number of threads currently performing the given activity. This view is especially useful for the visualization of Web URL requests or transaction-oriented traces.

It is understood that, the visualization tool builds internal data structures that correspond to individual interval records. For a given display window it builds internal data structures whenever necessary and scans the internal data structures to derive color or graphic objects for constructing a specific time-space diagram, which may be chosen randomly by the user. It should be understood that a given display window typically shows only a fraction of the trace file, while a scroll bar and zoom in/out functions are provided for showing the view over time. It is further understood that in addition to the views described above, other views may become possible if fields for additional significant discriminators also exist in interval records. Although all these views could be derived from the same multi-dimensional interval file, the available views depend upon each individual visualization tool. It is understood that skilled artisans may implement common features of visualization tools, such as zoom in/out functions, capability to hide and show individual timelines, graphic presentation of statistic information, source code browser, and views for call stacks, etc., to extend the functionality of the invention.

While the invention has been particularly shown and described with respect to illustrative and preferred embodiments thereof, it will be understood by those skilled in the art that the foregoing and other changes in form and details may be made therein without departing from the spirit and scope of the invention that should be limited only by the scope of the appended claims.

The invention claimed is:

1. A computer-implemented method for preparing data obtained from an event trace device for visualization on a display device, said method comprising the steps of:
   (a) collecting multi-dimensional event trace files comprising data representing one or more user-level trace events and computer system-level events; and
   (b) converting said multi-dimensional event trace files into multi-dimensional interval trace files, an interval trace file including a number of interval records, each record including an associated timestamp, a duration indication representing time duration for the interval, an interval type representing a particular state, and, discriminator information, a said interval being constructed by matching related begin and end events;
   (c) generating multiple two-dimensional time-space diagrams for analysis and performance visualization from said multi-dimensional interval trace files,
   wherein multiple two-dimensional time-space diagram views are derivable from a single multi-dimensional interval trace file.

2. The method of claim 1, wherein a number of available views depends on the number of discriminators and legend combinations available from the multi-dimensional trace file.

3. The method of claim 2, wherein an interval trace file further includes legend information.

4. The method of claim 3, wherein said collecting step a) includes the step of tracing system-level events to generate a discriminator and a legend information including one or more of: data relating to a running entity or thread; physical hardware or an activity or program state.

5. The method of claim 3, wherein a discriminator and legend represents a thread or running entity or a thread or running entity dispatch event, each thread or running event and a dispatch including a physical or logical identification.

6. The method of claim 3, further including the step of receiving more than one event trace file, said converting step c) further including the step of merging interval records from multiple trace files by reading the first interval from each trace file and ordering them according to a criteria.

7. The method of claim 3, wherein a criteria includes an end time for each interval.

8. The method of claim 3, wherein a derivable time-space diagram view includes one or more comprising: a thread-activity view; a processor-activity view; thread-processor view; a processor-thread view; an activity-thread view and connected thread-activity view.

9. A computer-implemented method for preparing data for two-dimensional space-time visualization on a display device, said data relating to a program execution on a computer system including one or more processor devices each handling one or more process threads, said method comprising the steps of:
   a) maintaining a thread stack comprising stack elements for each thread;
   b) collecting event data from a trace file including data associated with events; and,
   c) converting said event data into interval trace data by partitioning a timeline into interval pieces, each interval piece having an interval duration and a field to indicate an interval type representing a possible state, said intervals constructed by matching related begin and end events, wherein said converting further includes:
   determining if the received event is a dispatch event when a different process thread runs in a particular processor device, or determining if it is a begin event for a record type;
   creating an interval type for an old thread according to a top element of its thread stack if it is a dispatch event; or
   creating an interval piece for the stack element by reading the top element of the associated stack for the running thread if it is a begin event,
   wherein said converting enables creation of a multi-dimensional interval trace file used in generating said two-dimensional space-time visualization of said event data.

10. The method of claim 9, wherein said interval to be created for the old thread is one of a begin or continuation interval type depending on whether a begin interval has been generated for the state in this thread.

11. The method of claim 9, wherein the interval to be created for the old thread is a running interval if the top element of the stack associated with the old thread is a running event; and, updating the top element of the stack associated with the new thread to reflect a new starting time for its next interval.

12. The method of claim 9, wherein if the dispatch event is for the same running entity in the same processor, avoiding creation of an interval.

13. The method of claim 9, wherein said converting includes: determining if the top element is a running event wherein said interval piece is a complete running interval, or a begin/continuation interval if it is a user-level event.

14. The method of claim 9, wherein said converting further includes the step of determining whether any interval has been generated for the state in the thread determines if it is a begin or continuation interval; if a begin event, the step including pushing the event the conversion process pushes the event into the thread stack for a begin event.

15. The method of claim 14, wherein said determining further includes the step of determining if the event is an end event of some state, said converting step further including the step of:
   creating a complete interval or an end interval piece if an interval piece has already been generated for the state in the thread; and
running event and a dispatch including a physical or logical identification.

16. The method of claim 9, further including the step of receiving more than one event trace file, said converting step b) further including the step of merging interval records from multiple trace files by reading the first interval from each trace file and ordering them according to a criteria.

17. A computer program device readable by a machine, tangibly embodying a program of instructions executable by a machine to perform method steps for preparing data for two-dimensional space-time visualization on a display device, said data relating to a program execution on a computer system including one or more processor devices each handling one or more process threads, said method steps comprising:

a) maintaining a thread stack comprising stack elements for each thread;

b) collecting event data from a trace file including data associated with events; and, c) converting said event data into interval trace data by partitioning a timeline into interval pieces, each interval piece having an interval duration and a field to indicate an interval type representing a possible state, said intervals constructed by matching related begin and end events, wherein said converting further includes:

determining if the received event is a dispatch event when a different process thread runs in a particular processor device, or determining if it is a begin event for a record type;

creating an interval type for an old thread according to a top element of its thread stack if it is a dispatch event; or creating an interval piece for the stack element by reading the top element of the associated stack for the running thread if it is a begin event, wherein said converting enables creation of a multi-dimensional interval trace file used in generating said two-dimensional space-time visualization of said event data.

18. A computer system for visualizing data obtained from an event trace device providing event trace files, said system including:

(a) means for collecting multi-dimensional event trace data;

(b) means for converting said multi-dimensional event trace files into multi-dimensional interval trace files, an interval trace file including a number of interval records, each record including an associated timestamp, a duration indication representing time duration for the interval, an interval type representing a particular state, and, discriminator information, a said interval being constructed by matching related begin and end events; and (c) means for generating multiple two-dimensional time-space diagrams for analysis and performance visualization from said multi-dimensional interval trace files, wherein multiple two-dimensional time-space diagram views are derivable from a single multi-dimensional interval trace file.

19. The system of claim 18, wherein multi-dimensional event trace data is received as more than one event trace file, said converting step b) further including the step of merging interval records from multiple trace files by reading the first interval from each trace file and ordering them according to a criteria.

* * * * *